No. 821,715. PATENTED MAY 29, 1906.
E. A. HILDRETH.
SPLIT OR DIVIDED PULLEY.
APPLICATION FILED MAR. 16, 1905.

2 SHEETS—SHEET 1.

Witnesses.
Thomas Drummond.
S. W. Lutton.

Inventor.
Edwin A. Hildreth,
by Crosby Gregory, Attys.

UNITED STATES PATENT OFFICE.

EDWIN A. HILDRETH, OF HARVARD, MASSACHUSETTS.

SPLIT OR DIVIDED PULLEY.

No. 821,715.  Specification of Letters Patent.  Patented May 29, 1906.

Application filed March 16, 1905. Serial No. 250,373.

*To all whom it may concern:*

Be it known that I, EDWIN A. HILDRETH, a citizen of the United States, and a resident of Harvard, county of Worcester, State of Massachusetts, have invented an Improvement in Split or Divided Pulleys, of which the following description, in connection with the accompanying drawings, is a specification, like letters on the drawings representing like parts.

This invention relates particularly to split or divided pulleys; and it has for its object such a construction of the pulley and removable and interchangeable hubs therefor as to permit the manufacture of pulleys of standard sizes as to diameter and face, while adapting them to shafts of different diameters by means of the interchangeable hubs, insuring at the same time the accurate running of the pulley and the centralization of the hub therewith at all times. Manifestly if the pulley is caused to run out of true when the hubs are interchanged the usefulness of the pulley is injured or destroyed altogether. I have accordingly so constructed the pulley that the parts thereof upon which the hubs are seated can be accurately planed, and to do this to the best advantage each half of the pulley comprises a rim-section and a broad flat arm extending across the same and secured thereto near its ends. This is essential to give a large bearing-surface between the arm and the hub member to be seated thereon, and in order to insure the most perfect hub-seat and to prevent warping when in use I prefer to make each arm of a single piece of wood.

By providing a series of hubs having bores or shaft-recesses of different diameters I am enabled to fit any given pulley with the hub adapted to embrace the particular size of shaft required, the hubs of a series being interchangeable. A much better and stronger construction is thereby provided for the pulley, the hub clamping the same with the greatest firmness and rigidity upon the shaft.

The various novel features of my invention will be fully described in the subjoined specification and particularly pointed out in the following claims.

Figure 1:
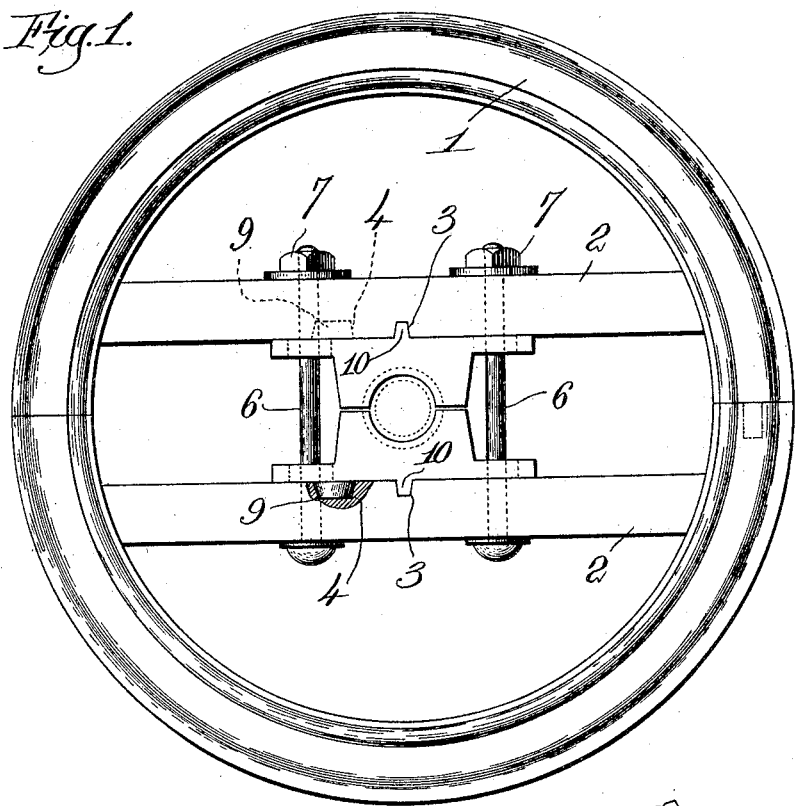
Figure 2:
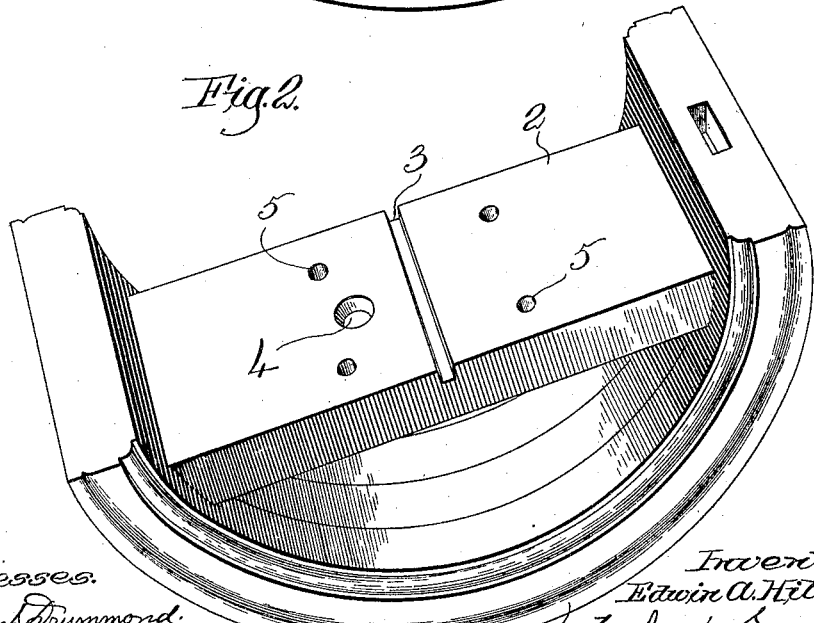
Figure 3:
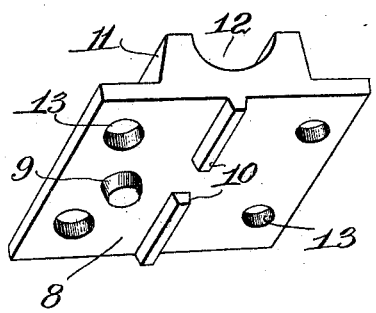
Figure 4:
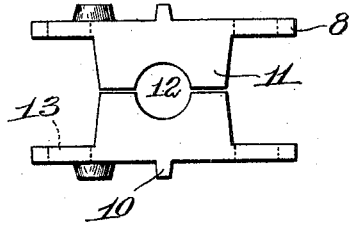
Figure 5:
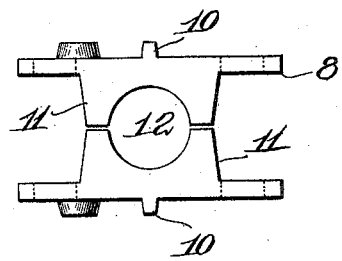
Figure 6:
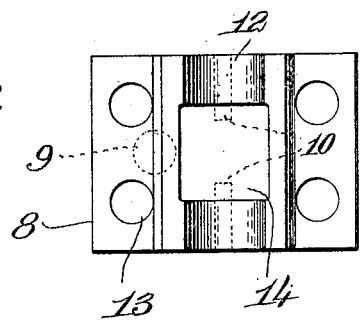

Figure 1 is a side elevation, partly broken out, of a split pulley with one embodiment of my invention applied thereto, the parts of the pulley and the hub being clamped together in operative condition. Fig. 2 is a perspective view of one of the pulley-halves, showing the hub-seat and a part of the means for positioning and centralizing the hub member. Fig. 3 is a perspective view of one of the members of the two-part hub, showing the under side of the base thereof and the positioning devices thereon. Figs. 4 and 5 are views in side elevation of two hubs having shaft recesses or bores of different diameter, but otherwise of the same dimensions, to be interchangeable on a pulley; and Fig. 6 is a top plan view of one of the hub members.

I have herein shown my invention embodied in a well-known form of split-wood pulley and shown in Fig. 1 as consisting of two like halves or parts each comprising a semicircular rim-section 1 and a rigidly-attached flat arm or hub-seat 2, the rim being divided diametrically and the hub-seats being set in from the ends of the rim-sections to afford room for the hub. The faces of the hub-seats are in planes parallel to the divisional plane of the pulley, as will be manifest from Fig. 1.

Referring to Fig. 2, the seat is shown as provided with a central transverse groove or recess 3 in its face, the said recess 3 being parallel to the axis of rotation of the pulley and so located that when the halves of the pulley are assembled the two recesses 3 will be diametrically opposite each other. (See Fig. 1.) At one side of the recess 3 a second recess, pit, or depression 4 is made in the seat-face and slightly conical, as herein shown, for a purpose to be described.

Holes 5, four being shown herein, are made in the hub-seats for the reception of connecting and clamping bolts 6, set up by suitable nuts 7, Fig. 1, to draw the halves of the pulley together and also to clamp the hub upon the shaft, as will be described.

The hub is made in two like parts or halves preferably as a casting, each member comprising a flat rectangular and enlarged base 8, herein shown as having two elongated and alined lugs 10 on its under face and a lug 9 at one side of the lugs 10 and a body portion 11 on its opposite side, the body having a semicylindrical shaft bore or recess 12. The alined lugs 10 are parallel to the longitudinal center of the shaft-bore 12, and they are of such a shape and size as to enter snugly the recess 3 in the hub-seat when the base 8 is seated thereupon. The lug 9 is made conical or tapered to fit into the recess 4 in the hub-seat, so that any axial movement of the hub member is prevented. As shown in Fig. 1, the lugs 10 enter the recess 3 and prevent any lateral movement of the hub member, while at the same time preserving the shaft-bore 12 in exact concentricity with the pulley-axis. The lugs 9 not only prevent axial displacement of the hub members, but they also serve to properly position the same end for end, preventing any reversal of the hub members when applied to the seats and obviating the use of marks to prevent such reversal.

Holes 13 in the hub-bases 8 register with the holes 5 in the seat 2 and are brought into register therewith by merely dropping the hub member onto the seat with its lugs 10 entering the recess 3 in the seat and the lug 9 in the recess 4.

Inasmuch as the two hub-seats are exactly alike and directly opposite each other when the pulley is assembled and inasmuch as one hub member is the counterpart of its fellow, it will be obvious that when the two-part hub is in place its shaft-bore 12 will be in exact position and concentric with the axis of the pulley.

By setting up the nuts 7 the bolts 6 clamp the hub members securely upon the shaft and at the same time clamp the pulley-halves together and upon the hub, forming an absolutely rigid structure.

By making the hubs of a series of standard size and providing shaft-bores of different diameters I am enabled by selecting a hub of the requisite shaft-bore to fit it immediately to a pulley of the required diameter and face, the hubs being thus interchangeable.

In Fig. 1 I have shown in dotted lines a larger and a smaller shaft-bore to clearly illustrate the interchangeable feature, the other portions of the hub members being of the same dimensions for the three different diameters of shaft-bore. This is also illustrated in Figs. 4 and 5, the bore of the hub shown in Fig. 4 being smaller than that shown in Fig. 5; but otherwise the two hubs are precisely the same in shape and size.

In making the bores it is unnecessary to make the same continuous, and to save metal and also machining a recess 14 is formed in each hub member (see Fig. 6) between the ends of the bore, the latter being accurately bored to fit the shaft.

Having fully described my invention, what I claim as new, and desire to secure by Letters Patent, is—

1. A split pulley comprising separable halves each having an arm constituting a broad, flat hub-seat having a transverse recess parallel to the pulley-axis, the two recesses being diametrically opposite when the pulley-halves are assembled, combined with a two-part detachable hub each member thereof having an enlarged flat base to rest directly on the adjacent hub-seat and provided with a projecting portion to enter the transverse recess in the seat, whereby the hub members are accurately positioned and centralized with relation to each other and to the axis of the pulley, there being coöperating means on each seat and hub-base to prevent reversal of the hub members, and means coöperating simultaneously with the two hub members and the pulley-halves to clamp the latter together and bind the former upon a shaft.

2. In a split pulley, broad, flat hub-seats and detachable two-part hub members, there being lugs on the one and recesses in the other parallel to the pulley-axis, the lugs entering the recesses and centralizing the hub members with relation to the pulley-axis, each hub member having an enlarged base to rest directly on the adjacent hub-seat, each of the latter having a non-centralized pit or depression, there being a lug on each hub-base to enter the same and prevent reversal of the hub member, and clamping-bolts passed directly through the hub-seats and the hub members, to clamp the halves of the pulley together and bind the hub members upon a shaft.

3. A split pulley comprising separable halves, each comprising a rim-section and a rigidly-attached flat hub-seat having a transverse central recess therein parallel to the pulley-axis, a detachable, two-part hub, each member having a flat base provided with positioning-lugs to enter the recess in the seat and thereby accurately centralize the hub members with relation to the pulley-axis, there being other means to prevent axial movement of the hub members on the hub-seats, and clamping-bolts extended through the seats and the hub members to simultaneously connect the halves of the pulley to the hub members and to clamp the latter upon a shaft.

4. A split pulley comprising separable halves each having a hub-seat, means to clamp the halves together with the seats opposed and in parallelism, each seat having a transverse recess parallel to the pulley-axis, and diametrically opposite the recess in the other seat, and a second recess in each seat offset from the transverse recess, combined with a two-part, detachable hub each member thereof having a semicylindrical recess for the shaft and a flat base adapted to rest on the seat and provided with lugs to enter the recesses therein and centralize the shaft-recess with relation to the pulley-axis and prevent reversal of the hub members.

5. A split pulley comprising separable halves each having a hub-seat, means to clamp the halves together with the seats opposed and in parallelism, a semicircular rim-section and a rigidly-attached, flat hub-seat provided with an elongated alining recess and a laterally offset pit or recess, a two-part hub the members of which have flat bases to rest upon the seats and projections to enter the recesses therein, to accurately position and centralize the hub members with relation to each other and to the axis of the pulley, and clamping-bolts extended through the seats and the bases of the hub members, to clamp the halves of the pulley together and bind the hub members upon a shaft.

In testimony whereof I have signed my name to this specification in the presence of two subscribing witnesses.

EDWIN A. HILDRETH.

Witnesses:
JOHN C. EDWARDS,
ELIZABETH R. MORRISON.